Nov. 17, 1936.  W. E. SHIVELY  2,061,522
INNER TUBE
Filed Feb. 17, 1934
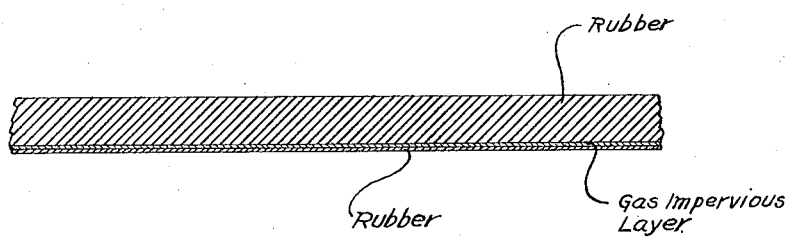
Inventor
Walter E. Shively
By
Attorney Patented Nov. 17, 1936

2,061,522

UNITED STATES PATENT OFFICE 2,061,522

INNER TUBE

Walter E. Shively, Fairlawn, Ohio, assignor to Wingfoot Corporation, Wilmington, Del., a corporation of Delaware Application February 17, 1934, Serial No. 711,739

13 Claims. (Cl. 154—14)

This invention relates to inner tubes for vehicle tires. More particularly it relates to an inner tube covered on the inside with a gas-impervious coating which is protected by a water-resistant coating.

Several tube manufacturers have been marketing an inner tube coated with a gas-impervious film, such as a film of gelatin and polyglycerol. Tubes of this type have been found to lose less air in service than ordinary tubes which are not so coated. However, coatings of this type have been found to have only a limited life. The air in inflated tubes is compressed and the humidity is high and changes in temperature cause condensation of water in the tubes. Water thus condensed or otherwise admitted to the tubes dissolves out the polyglycerol or other plasticizer used for the gelatin or acts upon the gelatin in some way and the coating material separates. At any rate it has been found that eventually in such tubes the gelatin hardens and becomes separated from the tube, after which the tubes are no more gas-impervious than uncoated tubes.

According to this invention the gas-impervious coating on the inner tubes is made water-resistant. This has been found to give the coating much longer life, and, in the preferred form of the invention, as long a life as the tubes themselves.

Inner tubes for automobile tires as now manufactured are smaller in circumference and diameter in the uninflated state than in the inflated state. In other words, after the tube is inserted in the tire and inflated it is stretched materially. Usually the cross-section of the inflated tube in the tire is some 20 or 30 per cent greater than the cross-section of a tube which is filled with air but not stretched, and the circumference of the tube in service is several per cent greater than the tube filled with air, but not stretched. Because of this stretching of the tube and the continual flexing to which the tube is subjected in use it is necessary that the gas-impervious coating and the waterproof coating shall be both elastic and also gas-impervious and water-proof, respectively, in the stretched condition. Furthermore, to be effective they must still adhere to the tube after being stretched and then allowed to return to the unstretched condition. They must also withstand temperature changes to which tubes are subjected in use.

In the manufacture of tubes with a gas-impervious coating as now carried out a jel-forming hydrophyllic colloid and plasticizer have been employed. Glue, casein, haemoglobin or other suitable colloid may be used and as a plasticizing agent polyglycerol or Turkey-red oil, etc. may be employed. Latex in varying amounts may be added to the gas-impervious film if desired. The coating may be applied by dissolving or suspending the colloid in water and adding the plasticizer and such other ingredients as are desirable and allowing the water to evaporate before vulcanizing. One coat or several coats of the coating material may be applied.

A layer two to three thousandths of an inch thick of gelatin, plasticized with polyglycerol or other suitable plasticizer forms a preferred gas-impervious coating. A coating composition made up of 50 parts by weight of water, 16⅔ parts by weight of gelatin and 33⅓ parts by weight of polyglycerol, if brushed onto the tube in such a way that there is about .12 pound of the solution for each 1000 square inches of tube surface will be found to be quite gas-impervious when dried. A rubber inner tube lined with such a coating, protected from moisture by an elastic adherent waterproof coating constitutes a preferred form of the invention.

The water-resistant covering must be elastic within the limits necessitated by the stretching of the tube in use and should be of such a composition that it adheres to the gas-impervious coating even after being repeatedly stretched and subjected to the distortions which inner tubes undergo in use. To be effective it must be water-resistant after such repeated stretching. A rubber covering, applied as a rubber cement has been found most satisfactory. The drawing shows a portion of the wall of an inner tube coated with a gas impervious layer which is protected by a rubber film. A single coat of rubber cement containing about 10% of rubber and sufficient sulfur (e. g. three per cent) and an accelerator to vulcanize the rubber when dry gives a covering which is water-resistant and adheres strongly to the gas-impervious coating after repeated stretching and flexing, and even for the life of the tube. The rubber may be dissolved in any suitable solvent. A mixture of benzene and rubber-solvent gasoline has proved most satisfactory. If only gasoline is used the coating has been found to form bubbles and after vulcanizing the surface is not as smooth as when some benzene is mixed with it. A cement from smoked rubber will ordinarily be used. Cements made from pale crepe, latex, or other forms of rubber may be used.

The coatings are preferably applied to the inner tubes by placing them on a mandrel of proper diameter which may be either straight or curved. The gas-impervious coating is first applied by brushing, spraying or dipping and then after drying, the water-proofing layer is applied by brushing, spraying or dipping or in any other suitable way. After the application of each coat of material the tubes are permitted to stand for a sufficient period of time to allow substantially complete evaporation of the volatile liquids contained within the coating materials before a subsequent coat is applied. Several coats of either or both coating materials may be used if desired. Coatings of the gelatin-containing composition may be alternated with coatings of the rubber cement. Each coat is preferably allowed to dry before the application of the next coat. After the various coatings have been applied and the tubes have been allowed to dry they are stripped from the mandrels and turned inside out so that the coating is on the interior surface of the tube. The ends of the tube are then joined to form an annulus, after which the coated tube is subjected to vulcanization in the usual molds in the ordinary manner.

If preferred, the tubes may be cured directly upon the mandrels and then be stripped off of and turned inside out. The ends of the cured tubes may then be buffed, cemented and spliced in the same manner as ordinary mandrel-cured tubes.

Tubes coated with gelatin and polyglycerol, with a covering of rubber applied as vulcanizable cement may be stretched and flexed even to the point of breaking or bursting without any tendency toward separation between the various coatings or the interior coating and the inner surface of the tube. In spite of repeated stretching and flexing the continuity of the films is not broken. The impermeability of the composite film covering to inflating media, such as air or other gas, and the resistance of the film to water, is unimpaired after prolonged use on an auto, truck, bus or other vehicle.

In addition to preventing the gas-impervious layer from becoming attacked by water the layer of rubber formed from the cement appears to protect it from chafing and wearing and thus prolong its life. Any suitable protecting coating may be used instead of rubber cement. It must be of such composition that it adheres to the gas-impervious coating under the conditions of use and withstands the temperature employed for vulcanizing or subsequent use of the tube in service.

What I claim is:

1. A rubber inner tube for vehicle tires, the interior surface of which is covered with a thin non-water-resistant coating which is more impervious to the passage of gas under pressure than rubber, and protecting this coating a closely adhering water-resistant rubber film.

2. A rubber inner tube for vehicle tires, the interior surface of which is coated with a thin gelatin-containing coating which is more impervious to the passage of gas under pressure than rubber, and protecting this coating a closely adhering water-resistant rubber film.

3. A rubber inner tube for vehicle tires, the interior surface of which is covered with a thin poly-glycerol-containing coating which is more impervious to the passage of gas under pressure than rubber, and covering this a closely adhering water-resistant rubber film.

4. A rubber inner tube for vehicle tires, the interior surface of which is covered with a thin non-fluent coating of gelatin and a water-soluble plasticizer which coating is more impervious to the passage of gas under pressure than rubber, and protecting this coating a closely adhering water-resistant rubber film.

5. A rubber inner tube for vehicle tires the interior surface of which is covered with a thin, non-fluent layer of gelatin and poly-glycerol which is more impervious to the passage of gas under pressure than rubber, and protecting this coating a closely adhering water-resistant rubber film.

6. The steps in the manufacture of a rubber inner tube for vehicle tires which comprises applying a thin gas-impervious coating of water-soluble material to vulcanizable inner tube material and thereafter protecting this coating by covering it with a film of rubber and then vulcanizing.

7. The method of manufacturing a rubber inner tube for vehicle tires which comprises covering vulcanizable inner tube material with a gas impervious coating of gelatin and poly-glycerol, covering this with a layer of vulcanizable rubber cement and then simultaneously vulcanizing the tube material and the cement.

8. A rubber inner tube for vehicle tires coated on the interior with a thin closely adhering water-resistant covering which is more impervious to the passage of gas under pressure than rubber.

9. A rubber inner tube for vehicle tires, the interior surface of which is covered with a thin non-water-resistant coating which is more impervious to the passage of gas under pressure than rubber, and protecting this coating a closely adhering water-resistant film.

10. A rubber inner tube for vehicle tires, the interior surface of which is coated with a thin gelatin-containing coating which is more impervious to the passage of gas under pressure than rubber, and protecting this coating a closely adhering water-resistant film.

11. A rubber inner tube for vehicle tires, the interior surface of which is covered with a thin poly-glycerol-containing coating which is more impervious to the passage of gas under pressure than rubber, and covering this a closely adhering water-resistant film.

12. A rubber inner tube for vehicle tires, the interior surface of which is covered with a thin non-fluent coating of gelatin and a water-soluble plasticizer which coating is more impervious to the passage of gas under pressure than rubber, and protecting this coating a closely adhering water-resistant film.

13. A rubber inner tube for vehicle tires the interior surface of which is covered with a thin, non-fluent layer of gelatin and poly-glycerol which is more impervious to the passage of gas under pressure than rubber, and protecting this coating a closely adhering water-resistant film.

WALTER E. SHIVELY.